(12) United States Patent
Cleghorn et al.

(10) Patent No.: US 8,104,639 B1
(45) Date of Patent: Jan. 31, 2012

(54) PIVOTING COLLAPSIBLE ELECTRICAL DEVICE COVER

(75) Inventors: Richard L. Cleghorn, Tempe, AZ (US); Jeffrey P. Baldwin, Phoenix, AZ (US)

(73) Assignee: TayMac Corporation, Gilbert, AZ (US)

( * ) Notice: Subject to any disclaimer, the term of this patent is extended or adjusted under 35 U.S.C. 154(b) by 443 days.

(21) Appl. No.: 12/366,276

(22) Filed: Feb. 5, 2009

Related U.S. Application Data

(60) Provisional application No. 61/114,420, filed on Nov. 13, 2008.

(51) Int. Cl.
- *B65D 43/14* (2006.01)
- *B65D 51/04* (2006.01)
- *H02G 3/08* (2006.01)
- *H01H 9/02* (2006.01)
- *H01H 13/04* (2006.01)
- *H02G 3/14* (2006.01)

(52) U.S. Cl. ......... 220/844; 220/3.7; 220/3.8; 220/4.02; 220/836; 220/843; 174/50; 174/58; 174/66; 174/67; 248/906

(58) Field of Classification Search ............... 220/3.7, 220/3.8, 4.02, 836, 843, 844; 174/50, 58, 174/66, 67; 439/535; 248/906
See application file for complete search history.

(56) References Cited

U.S. PATENT DOCUMENTS

| | | | |
|---|---|---|---|
| 7,431,594 B2 * | 10/2008 | Castaldo et al. | 439/135 |
| 7,479,598 B1 * | 1/2009 | Shotey et al. | 174/58 |
| 2008/0210452 A1 * | 9/2008 | Dinh et al. | 174/67 |

* cited by examiner

*Primary Examiner* — Anthony Stashick
*Assistant Examiner* — Madison L Wright
(74) *Attorney, Agent, or Firm* — Booth Udall, PLC

(57) ABSTRACT

An electrical device cover comprises a base with an opening in a back wall of the base sized to receive an electrical device and a lid coupled to the base at a first base end through a hinge, the lid pivotable between and open position and at least one closed position. The base comprises a track and a notch in a side of the track extending away from the first base end. A first end of the lid in a closed position is adjustable generally parallel to the back wall of the base toward and away from a second base end. A lid pin extends from the lid towards the track when the lid is in a closed position. In each closed position the lid pin seats in the at least one notch of the track when the first lid end is selectively adjusted toward the second base end.

19 Claims, 7 Drawing Sheets

PIVOTING COLLAPSIBLE ELECTRICAL DEVICE COVER

CROSS REFERENCE TO RELATED APPLICATIONS

This document claims the benefit of the filing date of U.S. Provisional Patent Application 61/114,420, entitled "Electrical Weatherproof Cover" to Richard Cleghorn, et al. which was filed on Nov. 13, 2008, the contents of which are hereby incorporated herein by reference.

BACKGROUND

1. Technical Field

Aspects of this document relate generally to electrical device covers.

2. Background Art

Electrical device covers are conventionally used to protect electrical devices from water and other contaminants, prevent access to electrical wires, and/or provide a particular decorative look to an installed electrical device. Conventional electrical device covers may include a variety of components, such as bases and lids, and may be mounted in a variety of orientations, such as horizontal or vertical. Electrical device covers may be used in a variety of locations, including interior/exterior walls or recessed within a wall or other structure.

SUMMARY

In an aspect, an electrical device cover comprises: a base configured to mount to an electrical box, the base comprising an opening in a back wall large enough to receive an electrical device, the base further comprising a first base end and a second base end and at least one track on a base wall at or near the second base end. The track comprises at least one notch in a side of the track, the notch extending away from the first base end. The lid comprises a first lid end and a second lid end, the first lid end hingedly coupled to the first base end through a hinge configured such that the first end of the lid is selectively adjustable generally parallel to the back wall of the base toward and away from the second base end. The lid further comprises a lid pin extending toward the track on the base wall when the lid is in at least one closed position in relation to the base. The lid is pivotable through the hinge with respect to the base between an open position and the at least one closed position. In each of the at least one closed position, the lid pin seats in the at least one notch of the track on the base when the first end of the lid is selectively adjusted toward the second base end.

Particular implementations may include one or more of the following. The hinge may comprise: a hinge pin holder on the base at or near the first base end, and; a hinge pin held by the hinge pin holder; wherein the lid is coupled to the hinge pin and is fixed in position relative to the hinge pin. The hinge pin holder may be shaped to mate with the shape of the hinge pin, when the first end of the lid is selectively adjusted toward the second base end in the at least one closed position, to latch the lid in the at least one closed position. The at least one track may comprise two tracks—one track on each of two opposite base walls. A cross section of the hinge pin may comprise the shape of a circle with a depression, the depression in the circle corresponding to a projection in the hinge pin holder such that when the depression aligns with the projection the first end of the lid is adjustable toward the second base end. The at least one notch of the track may comprise a first notch near a front opening of the base and a second notch near the back wall of the base, wherein in a first of the at least one closed position the lid pin is seated in the first notch and in a second of the at least one closed position the lid pin is seated in the second notch. The lid may be in a latched position when the lid pin is seated in the at least one notch.

In another aspect, an electrical device cover comprises a base configured to mount to an electrical box, the base comprising an opening in a back wall sized to receive an electrical device, a first base end, and a second base end; a hinge comprising: a hinge pin holder on the base at or near the first base end, and; a hinge pin held by the hinge pin holder; and a lid coupled to the hinge and pivotable with respect to the base through the hinge between an open position and at least one closed position; wherein the hinge pin is selectively adjustable towards and away from the second base end in a direction generally parallel to the back wall.

Particular implementations may include one or more of the following. A cross section of the hinge pin may comprise the shape of a circle with a depression, the depression in the circle corresponding to a projection of the hinge pin holder such that when the depression aligns with the projection the hinge pin is adjustable toward the second base end. The electrical device cover may further comprise: at least one track on a base wall at or near the second base end, the track comprising at least one notch in a side of the track, the notch extending away from the first base end; and the lid comprising a lid pin extending toward the track on the base wall when the lid is in the at least one closed position in relation to the base; wherein in each of the at least one closed position the lid pin seats in the at least one notch of the track on the base when the hinge pin is selectively adjusted toward the second base end. The at least one notch of the track may comprise a first notch near a front opening of the base and a second notch near the back wall of the base, wherein in a first of the at least one closed position the lid pin is seated in the first notch and in a second of the at least one closed position the lid pin is seated in the second notch. The lid may be in a latched position when the lid pin is seated in one of the first notch and second notch. The lid may be fixed in position relative to the hinge pin.

In another aspect, a method of using an electrical device cover comprises: mounting a base of the electrical device cover to an electrical box; receiving an electrical device through an opening in a back wall of the base; pivoting a lid, through a hinge coupled to the base, at or near a first base end and coupled to the lid at or near a first lid end, to an open position; pivoting the lid to at least one closed position and engaging a lid pin on the lid with a track on a base wall at or near a second base end; and latching the electrical device cover by selectively adjusting a first lid end generally parallel to the back wall of the base away from a second base end of the base, and seating the lid pin in a notch on the track.

Particular implementations may include one or more of the following. The steps of pivoting the lid to at least one closed position and engaging the lid pin may comprise: automatically pivoting the lid to at least one closed position by gravity upon manual release of the lid from an open position; and automatically adjusting the first lid end generally parallel to the back wall of the base toward the second base end by gravity. Seating the lid pin may comprise seating the lid pin in a first notch of the track near a front opening of the base. The method may further comprising sliding the lid pin along the track towards the back wall; and seating the lid pin in a second notch of the track near the back wall. The method may further comprise aligning a depression in a hinge pin of the hinge with a corresponding projection on a hinge pin holder of the hinge such that when the depression aligns with the projection, the second lid end is positioned for the lid pin to be seated in the notch. The method may further comprise pivoting the hinge pin with the position of the hinge pin fixed relative to the lid.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The electrical device cover will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an electrical device cover will become apparent for use with implementations of an electrical device cover from this disclosure. Accordingly, for example, although particular lids, bases, and hinge components are disclosed, such lids, bases, and hinge components and other implementing components may comprise any shape, size, style, type, model, version, measurement, concentration, material, quantity, and/or the like as is known in the art for such implementing components, consistent with the intended operation of an electrical device cover.

Figure 1:
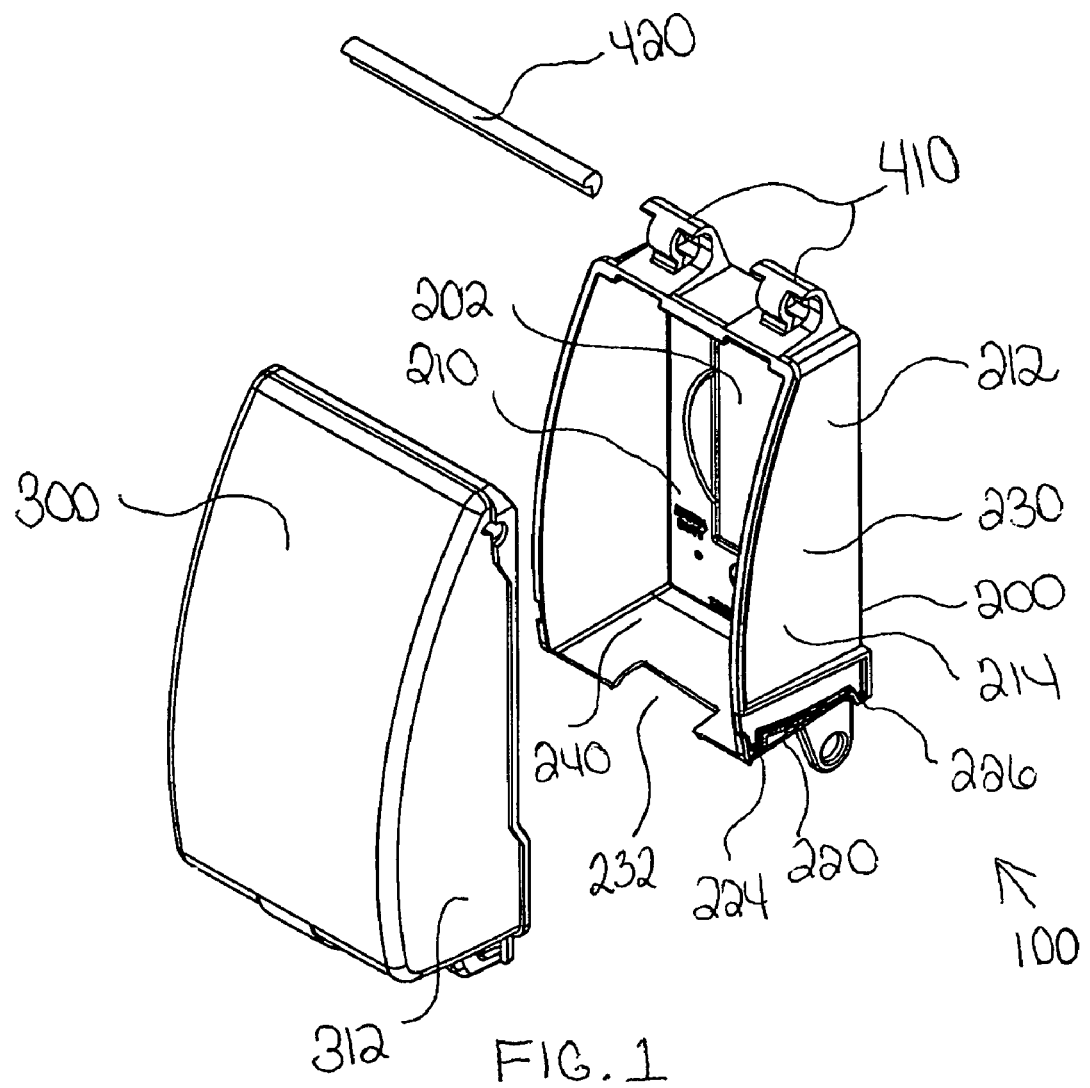
FIG. 1 is a break apart view of one implementation of an electrical device cover.

There are a variety of implementations of the electrical device cover assembly possible from the present disclosure. FIGS. 1-10 illustrate some non-limiting examples of implementations of an electrical device cover assembly, but those of ordinary skill in the art will readily comprehend other particular implementations and variations from the disclosure provided in relation to this particular implementation. Referring now to FIG. 1, in one particular implementation, an electrical device cover 100 comprises a base 200 configured to mount to an electrical box. The base 200 comprises an opening 202 in a back wall 210 large enough to receive an electrical device.

The electrical device may include, but is not limited to, an electrical outlet, a duplex electrical outlet, a decora electrical outlet, a ground fault circuit interrupt (GFCI) electrical outlet, a round electrical outlet, a switch, and so forth. In alternative implementations not shown in the figures, the base 200 may be configured to have one or more removable tab members or adapters allowing for the conversion from no opening 202 to an opening 202 sized for example to receive one of the electrical devices mentioned above or other electrical devices. The base 200 could also be configured to have one or more removable tab members or adapters allowing for the conversion from one sized opening 202 to another sized opening 202 such as to be capable of receiving various sizes of electrical devices. Examples of structures that may be used to enable a base member to be configured for conversion between various other configurations are shown and described in U.S. Pat. Nos. 6,723,922 to Shotey et al. (issued Apr. 20, 2004) titled "Universal cover plate", 6,987,225 to Shotey et al. (issued Jan. 17, 2006) titled "Convertible electrical device cover and method for installing same", 6,441,307 to Shotey et al. (issued Aug. 27, 2002) titled "Universal Cover Plate," and 6,770,816 to Shotey et al. (issued Aug. 3, 2004) titled "Convertible electrical device cover and method for installing same", the relevant disclosures of which are hereby incorporated herein by reference. As suggested in U.S. Pat. No. 6,770,816, the base member may be configured with an opening and attachment members and replaceable adapter plates may be used to enable the installer to select the desired base configuration. These references also include examples of removable cord escape tabs for vertical or horizontal orientations, which also may be included in the present electrical device cover, although not depicted in the drawings.

The base 200 further comprises a first base end 212 and a second base end 214 and a track 220 on a base wall 230 at or near the second base end 214. The track 220 comprises two notches in a side of the track 220, the notches extending away from the first base end 212. The notches comprise a first notch 224 near a front opening 240 of the base 200 and a second notch 226 near the back wall 210 of the base 200. In the embodiments depicted in FIGS. 1-10, the track 220 is proximate the second base end 214. In alternative embodiments the track may be located proximate the first base end 212 or somewhere in between. In various embodiments the track 220 comprises two tracks 220—one track 220 on each of two opposite base walls 230.

Figure 2:
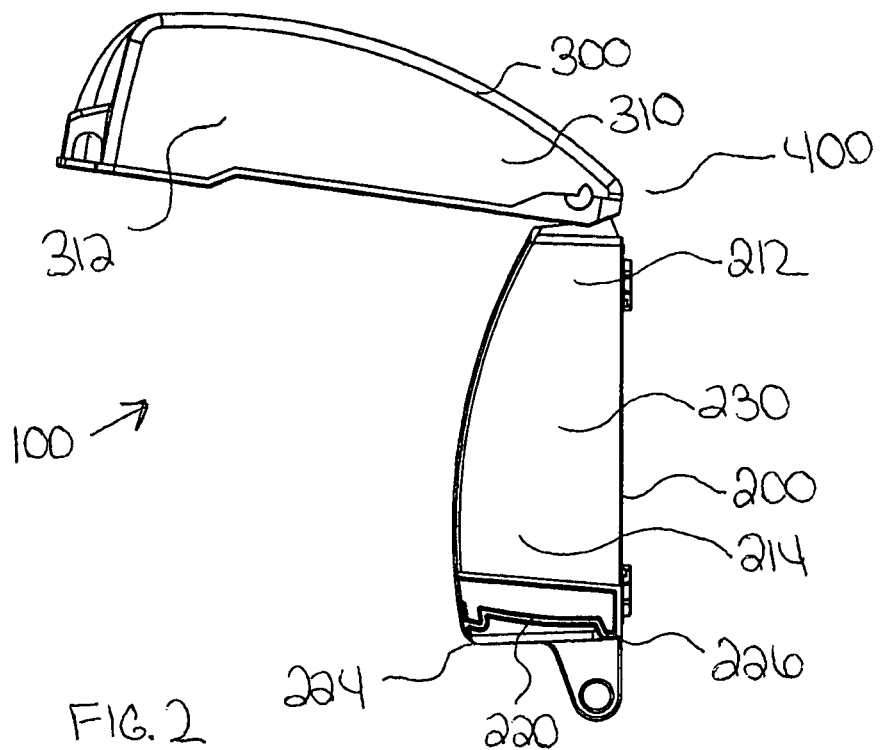
FIG. 2 is a side view of the electrical device cover of FIG. 1 assembled and in an open position.

The electrical device cover 100 further comprises a lid 300 comprising a first lid end 310 and a second lid end 312, the first lid end 310 hingedly coupled to the first base end 212 through a hinge 400 (FIG. 2) configured such that the first lid end 310 in a closed position (such as in FIGS. 3-9) is selectively adjustable generally parallel to the back wall 210 of the base 200 toward and away from the second base end 214. FIG. 2 is an assembled view of the electrical device cover 100 with the lid 300 in an open position. FIGS. 3-9 illustrate the electrical device cover 100 with the lid 300 in a closed position. When the lid 300 is in a first closed position, depicted in FIG. 4, the first lid end 310 is selectively adjustable in a direction not quite exactly parallel, but generally parallel, to the back wall 210 of the base 200, toward and away from the second base end 214. When the lid 300 is in a second closed position, depicted in FIG. 5, the first lid end 310 is selectively adjustable in a direction generally parallel to the back wall 210 of the base 200, toward and away from the second base end 214. Accordingly, although the first lid end 310 in the closed position of FIG. 4 is selectively adjustable in a direction generally parallel to the back wall 210 of the base 200.

The lid 300 further comprises a lid pin 320 (FIG. 9) extending toward the track 220 on the base wall 230 when the lid 300 is in at least one closed position in relation to the base 200. The lid pin 320 in this embodiment extends out from an inner sidewall of the lid 300. In other embodiments the lid pin 320 could extend out from an edge of the lid 300, or from an outer sidewall of the lid 300, and so forth. The lid pin 320 depicted in FIG. 9 is proximate the second lid end 312. In alternative embodiments the lid pin 320 could be proximate the first lid end 310 or somewhere in between. The lid 300 of this particular embodiment is pivotable through the hinge 400 with respect to the base 200 between an open position (FIG. 2) and two closed positions (FIGS. 3-4 and 9; and FIGS. 5-8). In each of the closed positions the lid pin 320 (FIG. 9) seats in the at least one notch of the track 220 on the base 200 when the first lid end 310 is selectively adjusted toward the second base end 214. In various other embodiments, the lid 300 may be pivotable with respect to the base 200 between an open position and only one closed position, or more than two closed positions, and so forth.

Figure 3:
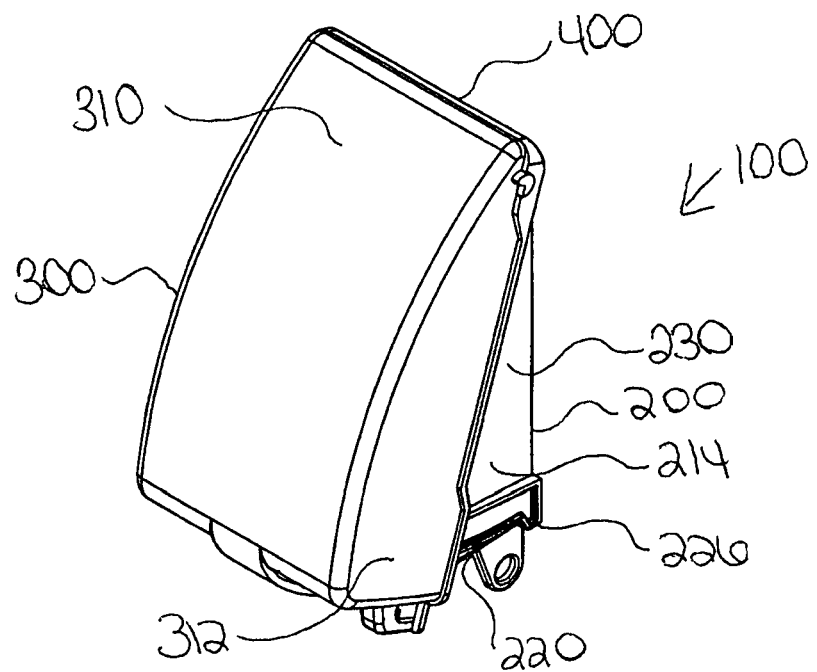
FIG. 3 is a perspective view of the electrical device cover of FIG. 2 in a first closed position.
Figure 5:
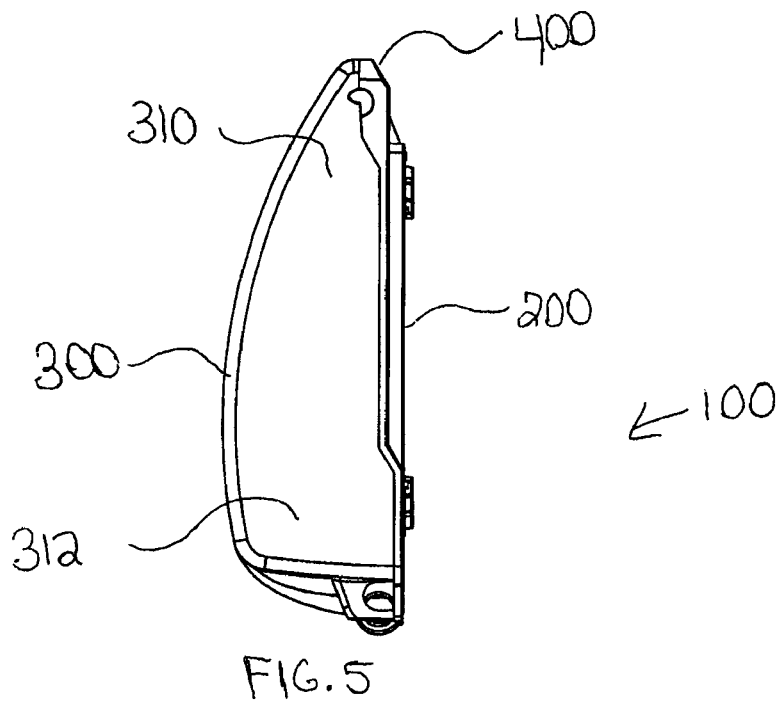
FIG. 5 is a side view of the electrical device cover of FIG. 2 in a second closed position.
Figure 4:
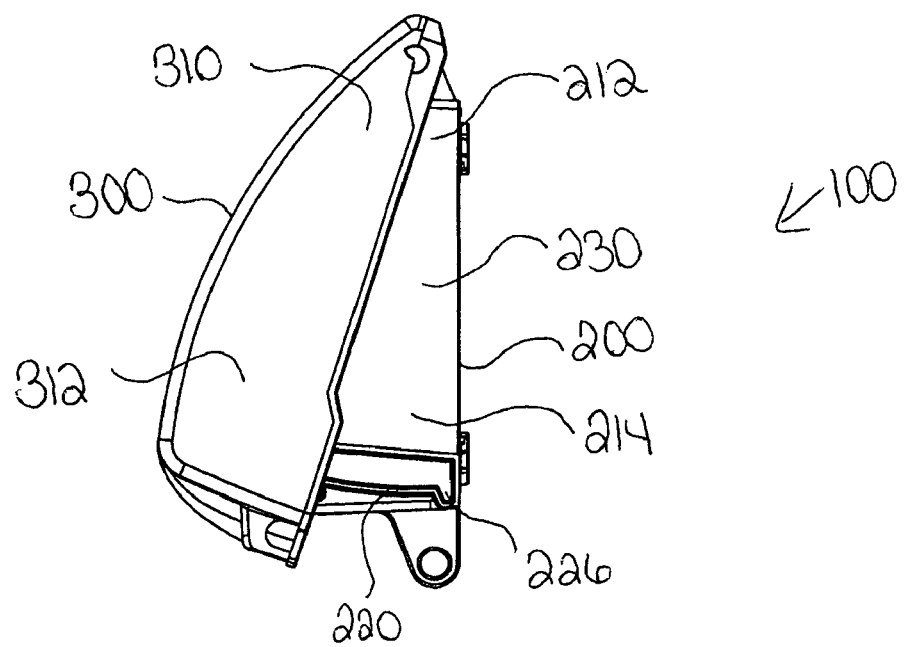
FIG. 4 is a side view of the electrical device cover of FIG. 2 in a first closed position.
Figure 6:
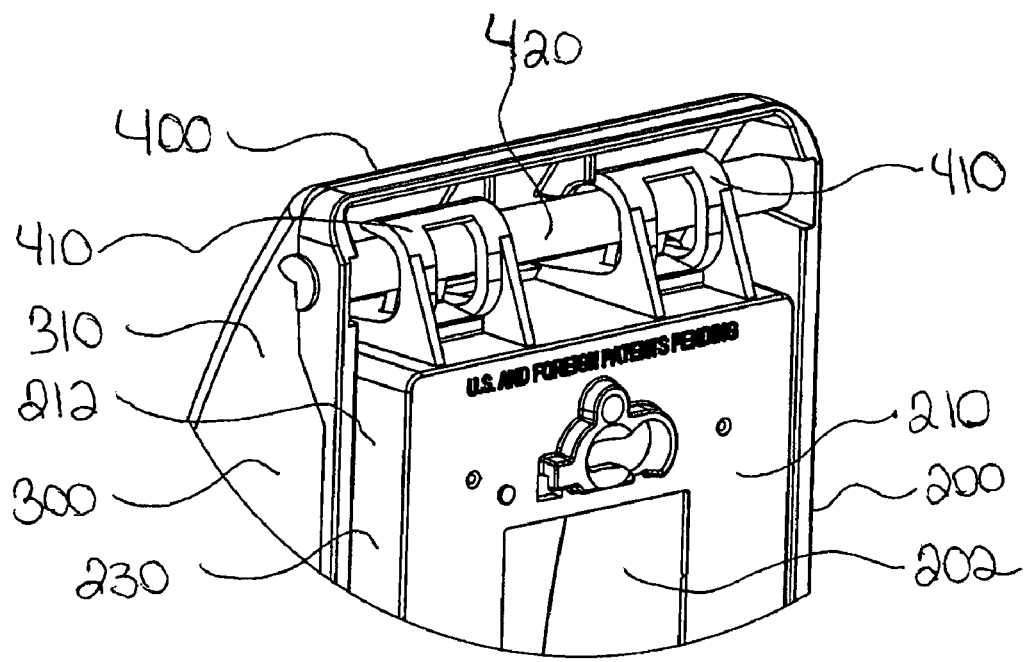
FIG. 6 is a perspective rear side view of an upper portion of the electrical device cover of claim 2 in a closed position with the first lid end selectively adjusted away from the second base end of the electrical device cover.
Figure 7:
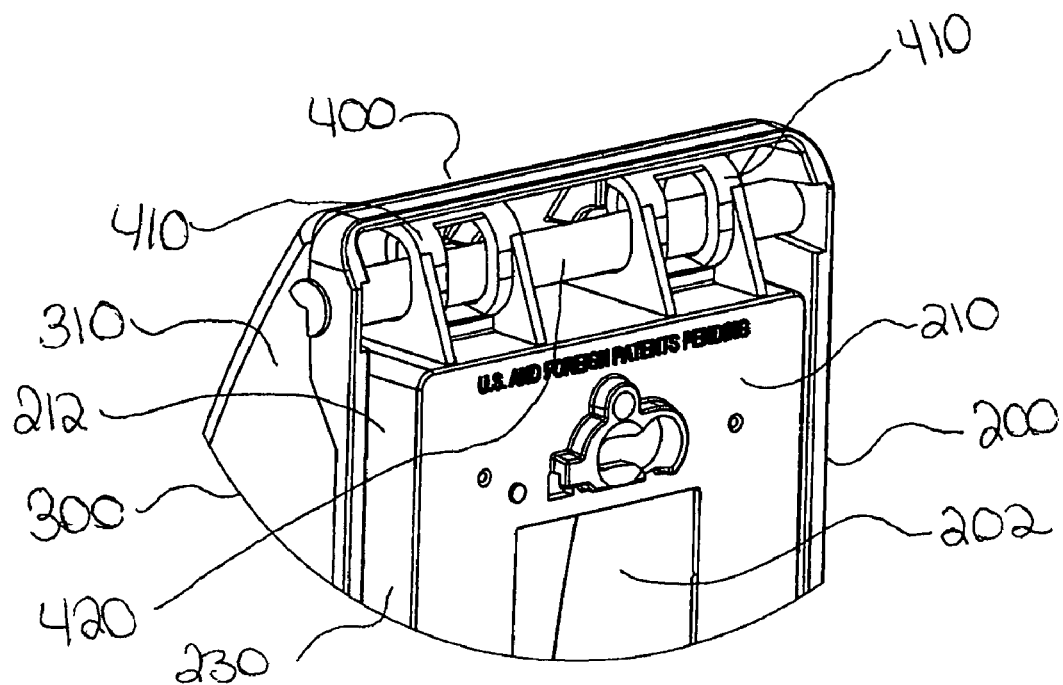
FIG. 7 is the electrical device cover of FIG. 6 with the first lid end selectively adjusted toward the second base end of the electrical device cover.

In the first closed position, pictured in FIGS. 3-4, the lid pin 320 (FIG. 9) is seated in the first notch 224. In a second closed position, pictured in FIG. 5, the lid pin 320 (FIG. 9) is seated in the second notch 226. When the lid pin 320 is seated in one of the notches (224 or 226) the lid 300 is in a latched position, meaning that the lid 300 is not pivotable with respect to the base 200 until a user manually adjusts the first lid end 310 away from the second base end 214 generally parallel to the back wall 210 to remove the lid pin 320 from the notch in which it is seated. Once the lid pin 320 fully exits the notch from which it is seated, the lid 300 is in an unlatched position and is again pivotable with respect to the base 200.

When the lid 300 is in the first closed position, depicted in FIGS. 3-4, a cord may exit the electrical device cover 100 through a cord escape 232 (FIG. 1) in the base 200. In this way the electrical device cover 100 may function as a while-in-use electrical device cover, allowing a user to plug a cord into an electrical device and then close the lid 300 to the first closed position—thereby protecting the electrical device and cord but still allowing the electrical device to be used. The cord escape 232 alternatively could be formed as part of the lid 300, or both the lid 300 and the base 200. The cord escape 232 may comprise in certain embodiments a push-out tab or other removable piece that when removed forms the cord escape 232.

In the implementation depicted in FIGS. 1-10, the hinge 400 comprises: a hinge pin holder 410 (FIG. 1) on the base 200 at or near the first base end 212; and a hinge pin 420 held by the hinge pin holder 410, and the lid 300 is coupled to the hinge pin 420 and is fixed in position relative to the hinge pin 420. In this particular embodiment, this is accomplished by approximating the shape of the cross section of the hinge pin 420, which is a circle with a depression or notch removed, with a matching hole in the lid 300, also a circle with a protrusion extending from an inner surface of the circle, configured to receive the hinge pin 420, so that when the lid 300 is coupled to the hinge pin 420 through the matching hole the lid 300 and hinge pin 420 are then rotationally fixed in position relative to each other. The lid 300 can then pivot and the hinge pin 420 will correspondingly pivot together with it. The hinge pin holder 410 is a passage through which the hinge pin 420 can pass. In alternative embodiments, the hinge pin holder 410 could comprise a snap-in holder, a tunnel, and so forth. The hinge pin holder 410 is fixed in position relative to the base 200. The hinge pin holder 410 may be shaped to mate with the shape of the hinge pin 420 (FIG. 8), when the first lid end 310 is selectively adjusted toward the second base end 214 in the at least one closed position, to assist in latching the lid 300 in a closed position.

Figure 8:
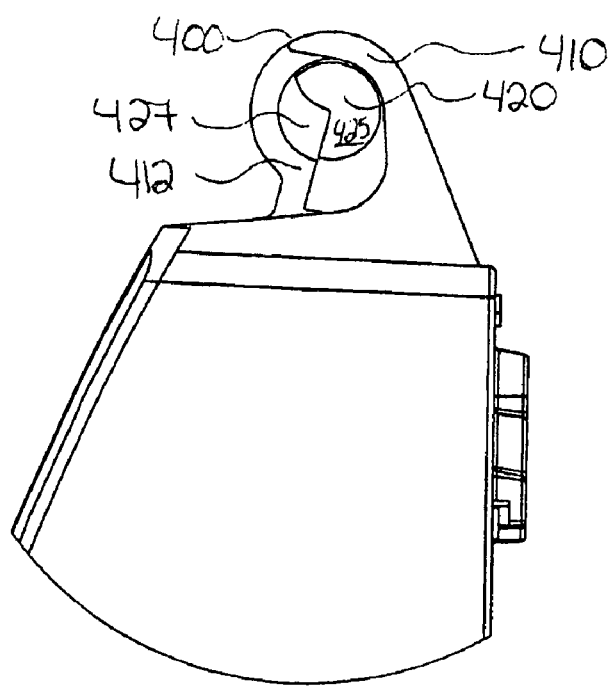
FIG. 8 is a side view of the base and hinge pin of the electrical device cover of FIG. 6.
Figure 9:
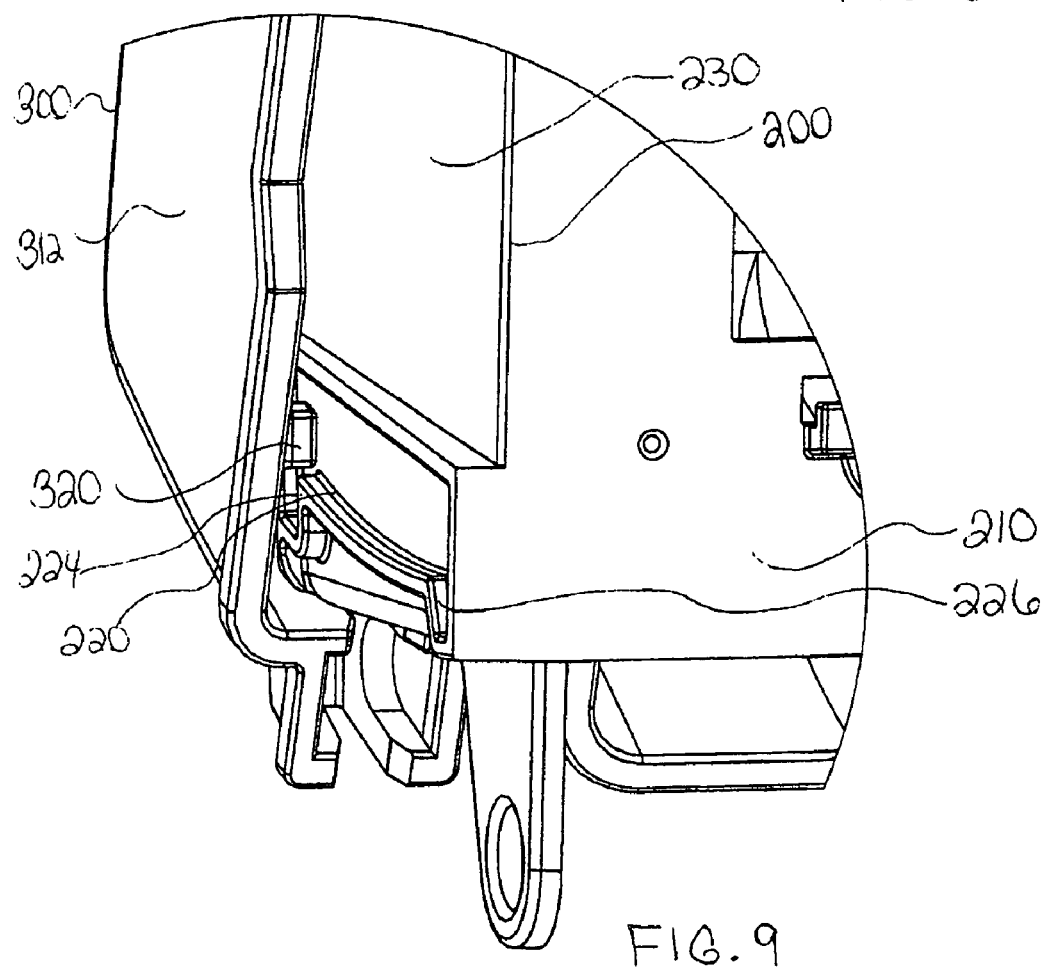
FIG. 9 is a perspective rear side view of a lower portion of the electrical device cover of claim 2 in a closed position.
Figure 10:
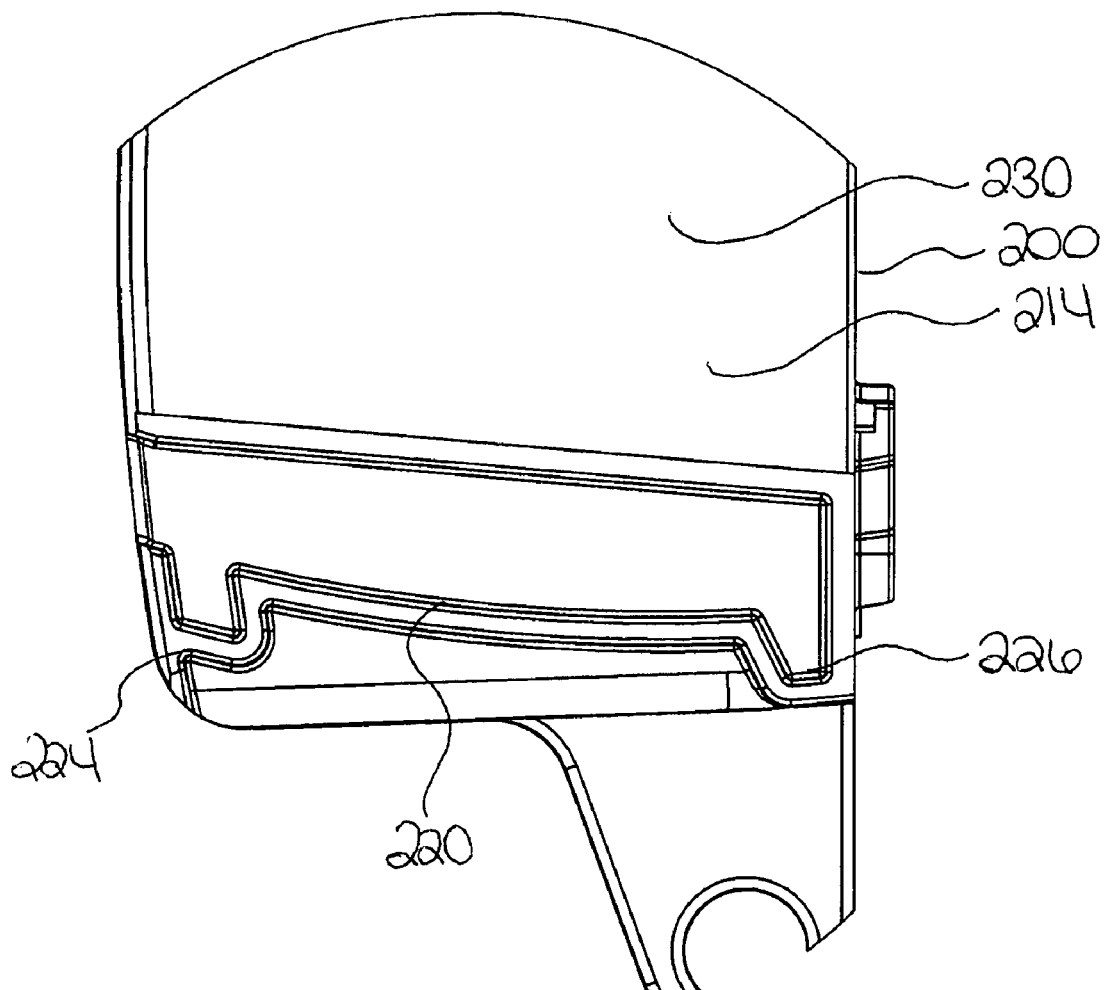
FIG. 10 is a side view of a lower portion of the base of the electrical device cover of FIG. 1.

Referring now to FIG. 8, an end 425 view of the hinge pin 420 comprises the shape of a circle with a depression 427, the depression 427 corresponding to a projection 412 in the hinge pin holder 410 such that when the depression 427 of the circle aligns with the projection 412 the first lid end 310 is adjustable toward the second base end 214. The end view in the illustrated embodiment of FIG. 8 is on the end 425 of the hinge pin 420. The hinge pin 420 need not comprise the shape of the end 425 with the shape of a circle with a depression 427 along the full length of the hinge pin 420—it could be only on one or both ends or in one or more discrete locations along the length of the hinge pin 420. For instance in various embodiments a portion of the hinge pin 420 may comprise one or more cross sections of a circle with a depression 427 while the rest of the hinge pin 420 comprises a cross section of a complete circle with no depression 427.

Figure 11:
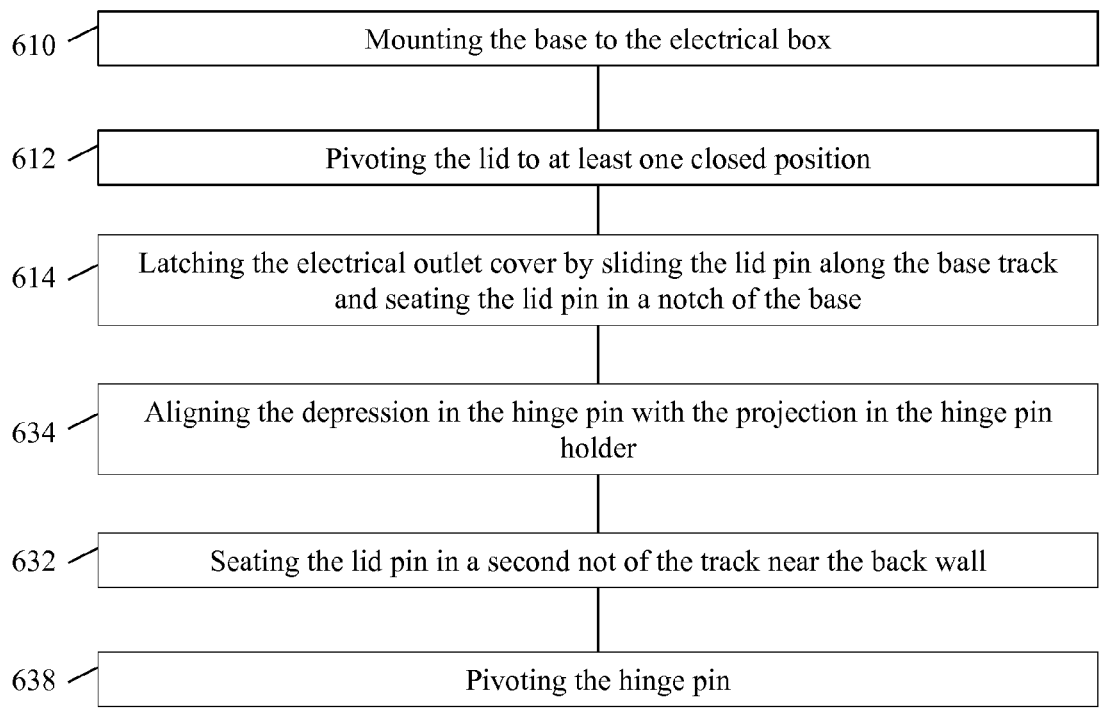
FIG. 11 is an illustration of a method of using an electrical device cover.

FIG. 11 illustrates a non-limiting example of one method of using the electrical device cover 100 described with reference to FIGS. 2-5, but those of ordinary skill in the art will readily comprehend other particular implementations and variations from the disclosure provided in relation to this particular method. Referring now to FIG. 11, a method of using an electrical device comprises mounting the base 200 to the electrical box (step 610). The base 200 is generally mounted to an electrical box like other conventional while-in-use cover using box mounting screws that extend through box mounting screw apertures in the base (see FIG. 6). The lid 300 is coupled to the base through a lid pin 320 as described elsewhere in this application. The method further comprises pivoting the lid to from an open position to a first closed position (step 612) and latching (step 614) the electrical outlet cover by sliding the lid pin along the base track and seating it in a notch of the base track. When the lid pin seats in the notch of the base, the lid moves downward in the direction of the bottom end of the base and the depression in the hinge pin couples with the projection in the hinge pin holder. The step of pivoting the lid to a closed position (step 612) may further comprise pivoting the lid to a second closed position where the lid is collapsed from its first closed position. This also involves sliding the lid pin along the base track (farther than with the previous opening to the track) and seating the lid pin in a second notch of the base track. The lid is again latched in this position by the hinge pin coupling with the projection in the hinge pin holder. The method may further comprise aligning the depression 427 in the hinge pin 420 with the projection 412 in the hinge pin holder 410 (step 634). The method may further comprise pivoting the hinge pin 420 (step 638).

In one method of using the electrical device cover 100 the step 610 comprises mounting a base 200 of the electrical device cover 100 to an electrical box and receiving an electrical device through an opening 202 in a back wall 210 of the base 200, step 612 comprises pivoting a lid 300, through a hinge 400 coupled to the base 200, at or near a first base end 212 and coupled to the lid 300 at or near a first lid end 310, to an open position and pivoting the lid 300 to at least one closed position and engaging a lid pin 320 on the lid 300 with a track 220 on a base wall 230 at or near a second base end 214, and step 614 comprises latching the electrical device cover 100 by selectively adjusting the first lid end 310 generally parallel to the back wall 210 of the base 200 toward the second base end 214 and seating the lid pin 320 in a notch on the track 220.

In this method the step 612 of pivoting the lid 300 to at least one closed position and engaging the lid pin 320 may further comprise automatically pivoting the lid 300 to at least one closed position by gravity upon manual release of the lid 300 from an open position, and automatically adjusting the first lid end 310 generally parallel to the back wall 210 of the base 200 toward a second base end 214 opposite the first base end 212 by gravity. The step of seating the lid pin in a notch of the base may comprise seating the lid pin 320 in a first notch 224 of the track 220 near a front opening 240 of the base by gravity. In other words a user holding the lid 300 in an open position may let go of the lid 300, and upon letting go of the lid 300 it may pivot towards the first closed position. Upon the lid 300 pivoting to the point where the lid pin 320 is aligned with the first notch 224, the first lid end 310 adjusts by gravity, generally parallel to the back wall 210 of the base, towards the second base end 214, and the lid pin 320 resultantly seats in the first notch 224.

This method may further comprise the step of sliding the lid pin 320 along the track 220 towards the back wall 210, and seating the lid pin 320 in a second notch 226 of the track 220 near the back wall 210 (step 632). The method may also further comprise aligning a depression 427 in a hinge pin 420 of the hinge 400 with a corresponding projection 412 in a hinge pin holder 410 of the hinge 400, such that when the depression 427 aligns with the projection 412, the second lid end 312 is positioned for the lid pin 320 to be seated in the notch. The method may further comprise pivoting the hinge pin 420 with the position of the hinge pin 420 fixed relative to the lid 300.

The method may further comprise allowing a cord to escape through the electrical device cover 100 through a cord escape 232 when the lid 300 is in the first closed position.

It will be understood that implementations are not limited to the specific components disclosed herein, as virtually any components consistent with the intended operation of a method and/or system implementation for an electrical device cover may be utilized. Accordingly, for example, although particular lids, hinges, and bases may be disclosed, such components may comprise any shape, size, style, type, model, version, class, grade, measurement, concentration, material, weight, quantity, and/or the like consistent with the intended operation of a method and/or system implementation for an electrical device cover.

The concepts disclosed herein are not limited to the specific implementations shown herein. For example, it is specifically contemplated that the components included in a particular implementation of an electrical device cover may be formed of any of many different types of materials or combinations that can readily be formed into shaped objects and that are consistent with the intended operation of an electrical device cover. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the electrical device covers, lids, bases, removable tabs, adapters, hinges, cord ports, and electrical devices, and any other components forming a particular implementation of an electrical device cover may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical device cover, it should be readily apparent that a number of modifications may be made without departing from the spirit thereof and that these implementations may be applied to other electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device cover, comprising:
a base configured to mount to an electrical box, the base comprising an opening in a back wall large enough to receive an electrical device, the base further comprising a first base end and a second base end and at least one track on a base wall at or near the second base end, the track comprising at least one notch in a side of the track, the notch extending away from the first base end;
a lid comprising a first lid end and a second lid end, the first lid end hingedly coupled to the first base end through a hinge configured such that the first end of the lid is selectively adjustable generally parallel to the back wall of the base toward and away from the second base end; the lid further comprising a lid pin extending toward the track on the base wall when the lid is in at least one closed position in relation to the base;
wherein the lid is pivotable through the hinge with respect to the base between an open position and the at least one closed position, and wherein in each of the at least one closed position the lid pin seats in the at least one notch of the track on the base when the first end of the lid is selectively adjusted toward the second base end.

2. An electrical device cover according to claim 1, wherein the hinge comprises: a hinge pin holder on the base at or near the first base end, and; a hinge pin held by the hinge pin holder; and wherein the lid is coupled to the hinge pin and is fixed in position relative to the hinge pin.

3. An electrical device cover according to claim 2, wherein the hinge pin holder is shaped to mate with a shape of the hinge pin, when the first end of the lid is selectively adjusted toward the second base end in the at least one closed position, to latch the lid in the at least one closed position.

4. The electrical device cover of claim 1, wherein the at least one track comprises two tracks—one track on each of two opposite base walls.

5. The electrical device cover of claim 2, wherein a cross section of the hinge pin comprises a shape of a circle with a depression, the depression in the circle corresponding to a projection in the hinge pin holder such that when the depression aligns with the projection the first end of the lid is adjustable toward the second base end.

6. The electrical device cover of claim 1, wherein the at least one notch of the track comprises a first notch near a front opening of the base and a second notch near the back wall of the base, and wherein in a first of the at least one closed position the lid pin is seated in the first notch and in a second of the at least one closed position the lid pin is seated in the second notch.

7. The electrical device cover of claim 1, wherein the lid is in a latched position when the lid pin is seated in the at least one notch.

8. An electrical device cover, comprising:
   a base configured to mount to an electrical box, the base comprising an opening in a back wall sized to receive an electrical device, a first base end, and a second base end;
   a hinge comprising: a hinge pin holder on the base at or near the first base end, and; a hinge pin held by the hinge pin holder; and
   a lid coupled to the hinge and pivotable with respect to the base through the hinge between an open position and at least one closed position;
   wherein the hinge pin is selectively adjustable towards and away from the second base end in a direction generally parallel to the back wall.

9. The electrical device cover of claim 8, wherein a cross section of the hinge pin comprises a shape of a circle with a depression, the depression in the circle corresponding to a projection of the hinge pin holder such that when the depression aligns with the projection the hinge pin is adjustable toward the second base end.

10. The electrical device cover of claim 8, further comprising: at least one track on a base wall at or near the second base end, the track comprising at least one notch in a side of the track, the notch extending away from the first base end; and the lid comprising a lid pin extending toward the track on the base wall when the lid is in the at least one closed position in relation to the base; wherein in each of the at least one closed position the lid pin seats in the at least one notch of the track on the base when the hinge pin is selectively adjusted toward the second base end.

11. The electrical device cover of claim 10, wherein the at least one notch of the track comprises a first notch near a front opening of the base and a second notch near the back wall of the base, and wherein in a first of the at least one closed position the lid pin is seated in the first notch and in a second of the at least one closed position the lid pin is seated in the second notch.

12. The electrical device cover of claim 11, wherein the lid is in a latched position when the lid pin is seated in one of the first notch and second notch.

13. The electrical device cover of claim 8, wherein the lid is fixed in position relative to the hinge pin.

14. A method of using an electrical device cover, comprising:
   mounting a base of the electrical device cover to an electrical box;
   receiving an electrical device through an opening in a back wall of the base;
   pivoting a lid, through a hinge coupled to the base, at or near a first base end and coupled to the lid at or near a first lid end, to an open position;
   pivoting the lid to at least one closed position and engaging a lid pin on the lid with a track on a base wall at or near a second base end; and
   latching the electrical device cover by selectively adjusting a first lid end generally parallel to the back wall of the base toward a second base end and seating the lid pin in a notch on the track.

15. The method of claim 14, wherein the steps of pivoting the lid to at least one closed position and engaging the lid pin comprise:
   automatically pivoting the lid to at least one closed position by gravity upon manual release of the lid from an open position; and
   automatically adjusting the first lid end generally parallel to the back wall of the base toward the second base end by gravity.

16. The method of claim 14, wherein seating the lid pin comprises seating the lid pin in a first notch of the track near a front opening of the base.

17. The method of claim 16, further comprising sliding the lid pin along the track towards the back wall; and seating the lid pin in a second notch of the track near the back wall.

18. The method of claim 14, further comprising aligning a depression in a hinge pin of the hinge with a corresponding projection on a hinge pin holder of the hinge such that when the depression aligns with the projection, the second lid end is positioned for the lid pin to be seated in the notch.

19. The method of claim 14, further comprising: pivoting the hinge pin with the position of the hinge pin fixed relative to the lid.

\* \* \* \* \*